United States Patent [19]

Hattori et al.

[11] 4,121,546
[45] Oct. 24, 1978

[54] AIR-FUEL RATIO ADJUSTING APPARATUS FOR AN INTERNAL COMBUSTION ENGINE

[75] Inventors: Tadashi Hattori, Okazaki; Hiroaki Yamaguchi, Aichi; Takamichi Nakase, Gamagori, all of Japan

[73] Assignee: Nippon Soken, Inc., Nishio, Japan

[21] Appl. No.: 723,050

[22] Filed: Sep. 13, 1976

[30] Foreign Application Priority Data

Oct. 28, 1975 [JP] Japan .................. 50/130154

[51] Int. Cl.² .................. F02B 3/08; F02M 7/12; F01N 3/08
[52] U.S. Cl. .................. 123/32 EE; 123/119 EC; 123/119 D; 60/276; 60/285
[58] Field of Search ...... 123/32 EA, 32 EE, 119 EC, 123/119 D, 119 DB, 124 B, 124 R, 140 MC; 60/276, 285

[56] References Cited

U.S. PATENT DOCUMENTS

| | | | |
|---|---|---|---|
| 3,759,232 | 9/1973 | Wahl et al. | 123/32 EE |
| 3,923,016 | 12/1975 | Hoshi | 123/32 EE |
| 3,991,726 | 11/1976 | Kawai et al. | 123/32 EE |
| 4,019,474 | 4/1977 | Nishimiya et al. | 60/276 |
| 4,022,171 | 5/1977 | Laprade et al. | 123/119 EC |
| 4,023,357 | 5/1977 | Masaki | 60/276 |
| 4,027,478 | 6/1977 | Masaki et al. | 60/285 |

FOREIGN PATENT DOCUMENTS

1,961,438 7/1970 Fed. Rep. of Germany ....... 123/124 B

*Primary Examiner*—Charles J. Myhre
*Assistant Examiner*—P. S. Lall
*Attorney, Agent, or Firm*—Cushman, Darby & Cushman

[57] ABSTRACT

An air-fuel ratio adjusting apparatus for an internal combustion engine employing a gas sensor whose electric characteristic changes rapidly at near the stoichiometric air-fuel ratio so as to maintain the air-fuel ratio of mixture at any desired air-fuel ratio other than the stoichiometric one. A bypass valve is mounted in a bypass passage for supplying additional air to the portion of the carburetor downstream of its throttle valve. In response to the sensed signal from the gas sensor mounted in the exhaust pipe, the bypass valve is opened or closed to increase or decrease the amount of additional air. Taking advantage of the fact that there exists a delay of a definite time period between the time of generation of a sensed signal from the gas sensor and the time that the sensed signal produces an effect on the excess air factor of the exhaust gases, by causing the opening and closing speeds of the bypass valve to differ from each other, it is possible to maintain the air-fuel ratio of mixture constant within a wide range of air-fuel ratios.

11 Claims, 6 Drawing Figures

AIR-FUEL RATIO ADJUSTING APPARATUS FOR AN INTERNAL COMBUSTION ENGINE

The present invention relates to apparatus for adjusting the air-fuel ratio of a mixture and more particularly the invention relates to an air-fuel ratio adjusting apparatus for an internal combustion engine wherein the composition of exhaust gases is detected by a gas sensor so as to adjust the air-fuel ratio of the mixture supplied to the engine to attain the proper value thereby accomplishing the desired exhaust emission control of the engine.

In a known air-fuel ratio adjusting apparatus of the above type, the oxygen content of the exhaust gases is sensed by a gas sensor provided in the exhaust pipe of the engine, whereby a valve for controlling the introduction of additional air is operated in response to the output signal of the gas sensor to control the air-fuel ratio of mixture to attain the proper value. In this type of conventional apparatus, the gas sensor mounted in the exhaust pipe of the engine comprises an oxygen content sensor employing zirconium dioxide, titanium dioxide or the like. Thus, in the case of the sensor employing a zirconium dioxide, for example, its electromotive force or resistance value changes rapidly near the stoichiometric air-fuel ratio (i.e., excess air factor $\lambda = 1$) as shown in FIG. 1. Consequently, while a feedback control employing a gas sensor having such electric characteristic is quite suitable, if it is desired to control by feedback the air-fuel ratio of mixture a to attain a desired air-fuel ratio other than the stoichiometric one in an exhaust emission control system, the conventional apparatus cannot meet this demand.

With a view to overcoming the foregoing difficulty, it is an object of this invention to provide an improved air-fuel ratio adjusting apparatus of the type which is so designed that the air-fuel ratio of a mixture supplied to an internal combustion engine is feedback-controlled by additionally supplying correcting air to the portion of the carburetor downstream of its throttle valve in response to the output signal of a gas sensor mounted in the exhaust pipe of the engine, wherein the feedback control of the air-fuel ratio of the mixture is accomplished with improved accuracy.

It is another object of this invention to provide an improved air-fuel ratio adjusting apparatus wherein the time rates of change of increase and decrease in the amount of additional air are controlled so as to assume different values, whereby the air-fuel ratio of the mixture is feedback-controlled to attain any desired air-fuel ratio which is different from the stoichiometric air-fuel ratio ($\lambda = 1$). In other words, when it is desired to control the mixture so that the feedback-controlled air-fuel ratio attains a value which is smaller than the stoichiometric air-fuel ratio ($\lambda = 1$), this is achieved by making the time rate of change of decrease in the amount of additional air greater than that for increasing the amount of additional air, whereas when it is desired to control the mixture so that the feedback-controlled air-fuel ratio attains a value which is greater than the stoichiometric air-fuel ratio, this is achieved by making the time rate of change of increase in the amount of additional air greater than that for decreasing the amount of additional air.

The apparatus of this invention has among its advantages the fact that it is capable of always feedback-controlling the air-fuel ratio of a mixture to attain any desired air-fuel ratio even if the output characteristic of the gas sensor has been deteriorated or the output characteristic has been changed by the exhaust gas temperatures.

The above and other objects, features and advantages of the invention will become more apparent from the following detailed description of a preferred embodiment of the invention when taken in conjunction with the accompanying drawings.

The present invention will now be described in greater detail with reference to the illustrated embodiment.

Figure 1:
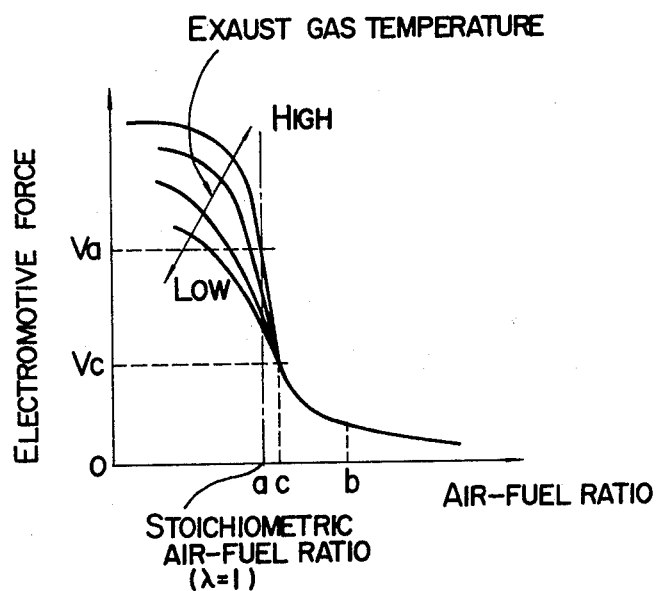
FIG. 1 is an output characteristic diagram of a gas sensor which is used with the invention, showing the relationship between variations of the air-fuel ratio and variations of the electromotive force.
Figure 2:
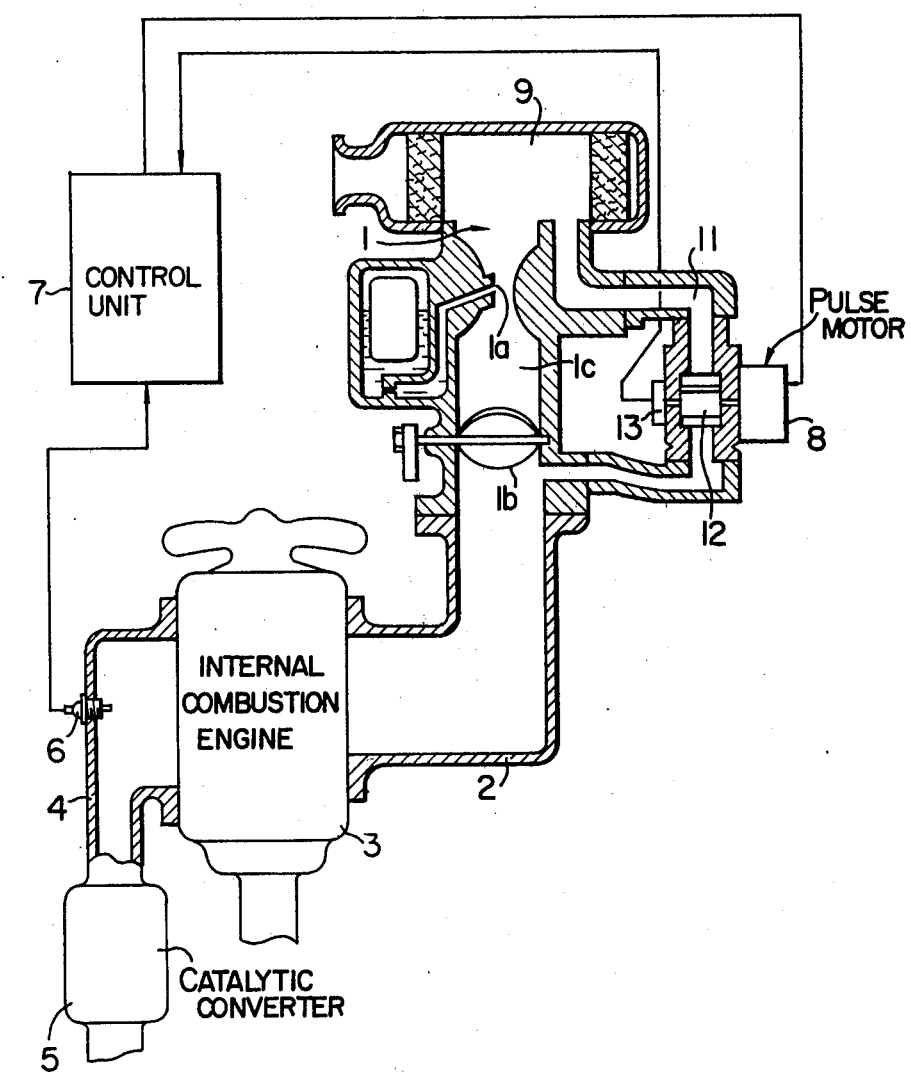
FIG. 2 is a schematic diagram showing a preferred embodiment of this invention.

Referring first to FIG. 2 showing the general construction of the embodiment, numeral 1 designates a carburetor of the ordinary type by which fuel is supplied to an internal combustion engine 3 from a fuel nozzle 1a through a main passage 1c and an intake manifold 2 in an amount proportional to the amount of intake air which is adjusted in response to the opening of a throttle valve 1b. The internal combustion engine 3 is a four cycle, spark ignition engine which employs gasoline or LP gas. Of course, the engine 3 may be any other type of engine. The carburetor 1 should preferably be adjusted so that the mixture supplied to the engine 3 is maintained on the slightly rich side in relation to the desired air-fuel ratio of the mixture demanded by the engine 3. Disposed parallel to the carburetor 1 is an additional air passage 11 communicating an air cleaner 9 with the carburetor portion downstream of the throttle valve 1b. The additional air passage 11 is provided with a butterfly bypass valve 12 for controlling the amount of air flow through the passage 11 and a pulse motor 8 for driving the bypass valve 12. The additional air passage 11, the bypass valve 12 and the pulse motor 8 constitute adjusting means for controlling the amount of additional air supplied to the engine 3. Numeral 13 designates a fully closed position sensor for sensing the fully closed position of the bypass valve 12. The contacts of this sensor are closed when the bypass valve 12 is brought into its fully closed position. Numeral 5 designates a three-way catalytic converter mounted in the downstream portion of an exhaust pipe 4 for cleaning the exhaust gases. Numeral 6 designates a gas sensor mounted in the exhaust pipe 4 and comprising a metal oxide such as zirconium dioxide for detecting the oxygen content of the exhaust gases. The output signal of sensor 6 changes in response to the detected oxygen content which is closely related to the air-fuel ratio of the mixture and this electromotive force changes in a step fashion near the stoichiometric air-fuel ratio (designated at a point $a$) as shown in FIG. 1. When the seonsor 6 is at its operating temperature, it generates a voltage signal having a voltage range between 100 millivolts and 1 volt. In the absence of oxygen in the exhaust gas, indicating a rich air-fuel ratio, the voltage output of the sensor 6 approaches 1 volt, and in the presence of oxygen indicating a lean air-fuel ratio, the voltage output of the sensor 6 approaches 100 millivolts. A control unit 7 receives as its inputs the signals from the gas sensor 6 and the fully closed position sensor 13, so that the direction of rotation and the rotational speed of the pulse motor 8 are controlled in response to these input signals, so as to control the amount of additional air and thereby adjust the air-fuel ratio of mixture.

The detailed construction of the control unit 7 will now be described with reference to FIG. 3. In this Figure, numeral 7a designates a comparator comprising a resistor 101, a differential operational amplifier 104 (hereinafter referred to as an OP AMP) and voltage dividing resistors 102 and 103 for applying a preset voltage to the inverting input terminal of the OP AMP 104. The noninverting input terminal of the OP AMP 104 is connected to the gas sensor 6 through the resistor 101. The voltage determined by the voltage dividing resistors 102 and 103 is preset so as to be equal to an electromotive force $V_a$ produced by the gas sensor 6 at practically the stoichiometric air-fuel ratio. Consequently, when the air-fuel ratio sensed by the gas sensor 6 is smaller than the stoichiometric air-fuel ratio, i.e., when the mixture is rich, a "1" level signal is generated at an output terminal A of the comparator 7a, whereas a "0" level signal is generated at the output terminal A when the sensed air-fuel ratio is greater than the preset value.

Numeral 7b designates a pulse generating circuit comprising a resistor 108, a capacitor 107, NAND gates 105 and 106 and flip-flops 109 and 110. This circuit generates pulse signals of different frequencies at its output terminals B and C. In this circuit, the NAND gates 105 and 106, the capacitor 107 and the resistor 108 constitute an astable multivibrator so that the frequency of the clock pulses generated from the astable multivibrator is divided by the flip-flop 109 and the frequency of the output signals of the flip-flop 109 is divided by the flip-flop 110. Consequently, it is evident that the frequency of pulse signals generated at the output terminal B is higher than that of pulse signals generated at the output terminal C.

The fully closed position sensor 13 comprises a resistor 13a and a switch 13b so that when the bypass valve 12 is in the fully closed position, the switch 13b is closed and a "0" level signal is generated at an output terminal D.

Numeral 7c designates a command circuit comprising inverters 111 and 112 and NOR gates 113 and 114 and it receives as its input signals the output signals of the comparator 7a, the pulse generating circuit 7b and the fully closed position sensor 13. More particularly, the NOR gate 113 has one input terminal connected to the output terminal B of the pulse generating circuit 7b and its other input terminal connected to the output terminal A of the comparator 7a through the inverter 111, and the output terminal of the NOR gate 113 is connected to an input terminal O of a reversible shift register 7d. The NOR gate 114 has one input terminal connected to the output terminal C of the pulse generating circuit 7b, another of its input terminals connected to the output terminal D of the fully closed position sensor 13 through the invertor 112 and its remaining input terminal connected to the output terminal A of the comparator 7a. The output terminal of the NOR gate 114 is connected to an input terminal P of the reversible shift register 7d.

Figures 4A, 4B:
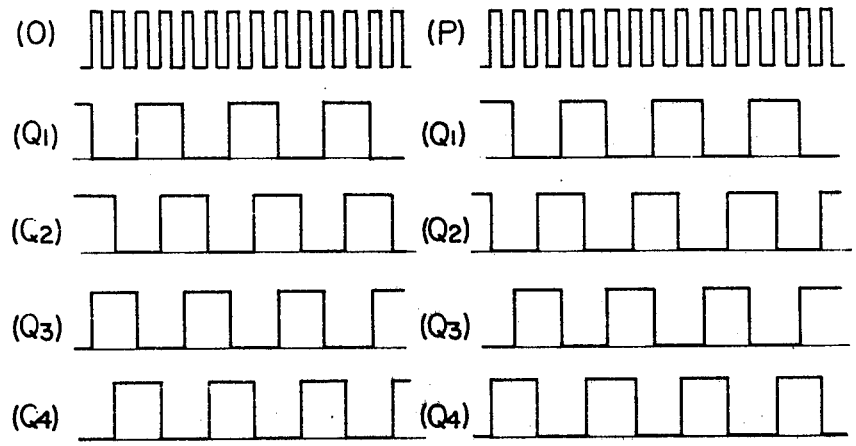
FIGS. 4A and 4B are signal waveform diagrams each showing input and output characteristics of the reversible shift register used in the embodiment of FIG. 2.

When pulse signals are applied to the input terminal O of the reversible shift register 7d, its output terminals $Q_1$, $Q_2$, $Q_3$ and $Q_4$ are sequentially shifted in this order as shown in FIG. 4A, whereas when the pulse signals are applied to the input terminal P, the output terminals $Q_4$, $Q_3$, $Q_2$ and $Q_1$ are shifted sequentially in this order as shown in FIG. 4B.

Figure 3:
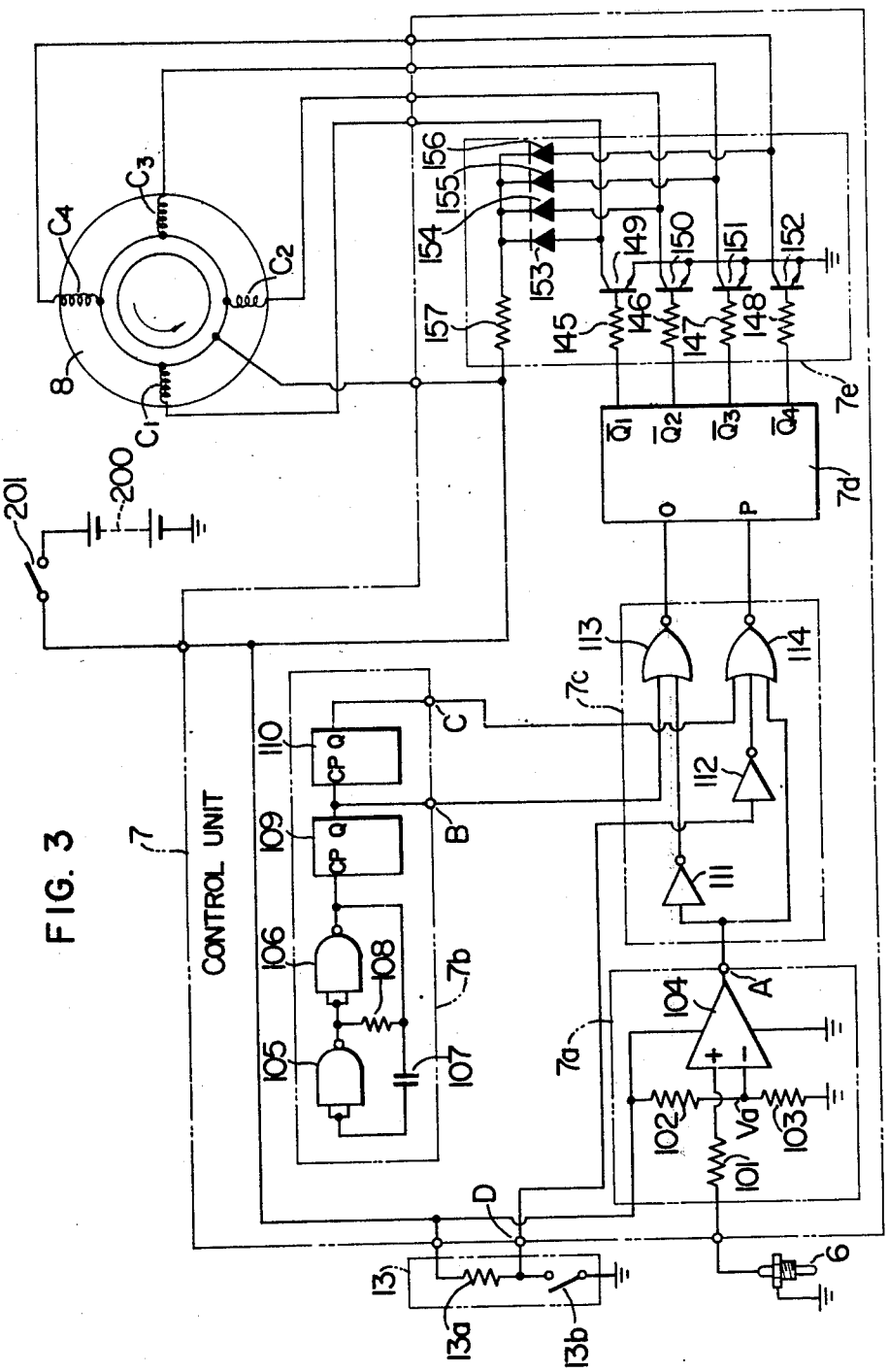
FIG. 3 is a wiring diagram showing a part of the embodiment shown in FIG. 2.

In FIG. 3, the output terminals $Q_1$, $Q_2$, $Q_3$ and $Q_4$ are connected to a switching circuit 7e comprising resistors 145, 146, 147, 148 and 157, transistors 149, 150, 151 and 152 and back electromotive force absorbing diodes 153, 154, 155 and 156, and the switching circuit 7e is in turn connected to field coils $C_1$, $C_2$, $C_3$ and $C_4$ of the pulse motor 8. Consequently, when the pulse signals are applied to the input terminal O of the reversible shift register 7d, the transistors 149, 150, 151 and 152 are sequentially turned on so that the field coils $C_1$, $C_2$, $C_3$ and $C_4$ of the pulse motor 8 are sequentially energized and the pulse motor 8 is rotated in the direction of the arrow in FIG. 3. When the pulse motor 8 is rotated in the direction of the arrow, the bypass valve 12 is driven in a direction which opens it. On the other hand, when the pulse signals are applied to the input terminal P, the pulse motor 8 is rotated in a direction opposite to the direction of the arrow and the bypass valve 12 is driven in a direction which closes it. It is needless to say that since the frequency of the pulse signals applied to the input terminal O of the reversible shift register 7d is higher than that of the pulse signals applied to the input terminal P, the rotational speed of the pulse motor 8 in the direction of the arrow is higher than that when the motor is driven in the direction opposite to the direction of the arrow.

The control unit 7 and the pulse motor 8 are supplied with power from a DC power source 200, such as a battery through an ignition key switch 201 of the engine 3.

With the construction described above, the operation of the apparatus of this invention, particularly the feedback control for the case when the desired air-fuel ratio is at a point b of FIG. 1 which is greater than the stoichiometric air-fuel ratio, will now be described with reference to FIG. 3. Firstly, when the electromotive force from the gas sensor 6 is higher than the present voltage $V_a$, the comparator 7a determines that the air-fuel ratio of the mixture supplied to the engine 3 is small and a "1" level signal is generated at its output terminal A. This signal is inverted by the inverter 111 and the resulting "0" level signal is applied to the input terminal of the NOR gate 113. This "0" level signal opens the NOR gate 113 and consequently the pulse signals generated at the output terminal B of the pulse generating circuit 7b pass NOR gate 113 are applied to the input terminal O of the reversible shift register 7d. On the other hand, the "1" level signal at the output terminal A of the comparator 7a is applied to the input terminal of the NOR gate 114 so that the NOR gate 114 is closed and the pulse signals generated at the output terminal C of the pulse generating circuit 7b are not applied to the input terminal P of the reversible shift register 7d. Consequently, the pulse motor 8 is rotated in the direction of the arrow and the degree of opening of the bypass valve 12 is increased, thus increasing the amount of additional air supplied to the carburetor portion downstream of the throttle valve 1b in proportion to the opening of the bypass valve 12 and thereby increasing the air-fuel ratio of the mixture supplied to the engine 3.

On the other hand, when the air-fuel ratio of the mixture is increased by the increased amount of the additional air so that the electromotive force from the gas sensor 6 becomes lower than the preset voltage $V_a$, the comparator 7a generates a "0" level signal. This "0" level signal is applied to the input of the NOR gate 114 and at this time, since the bypass valve 12 is not fully closed, the fully closed position sensor 13 generates at its output terminal D a "1" level signal which in turn is inverted by the inverter 112 and applied to the NOR gate 114 so that the NOR gate 114 is opened and the command circuit 7c applies the pulse signals generated at the output terminal C of the pulse generating circuit 7b to the input terminal P of the reversible shift register 7d. On the other hand, the "0" level signal at the output terminal A of the comparator 7a is inverted by the inverter 111 and applied to the NOR gate 113, with the result that the NOR gate 113 is closed and the pulse signals generated at the output terminal B of the pulse generating circuit 7b are not applied to the input terminal O of the reversible shift register 7d. Thus, the pulse motor 8 is rotated in the direction opposite to the direction of the arrow and the bypass valve 12 is rotated in the direction which closes it. Consequently, the amount of additional air supplied to the carburetor downstream of the throttle valve 1b is decreased and the air-fuel ratio of mixture supplied to the engine 3 is decreased. In this case, it is evident that the time rate of change of decrease in the amount of additional air is made smaller than that for increasing the amount of additional air. In addition, when the bypass valve 12 is brought into its fully closed position, the switch 13b of the fully closed position sensor 13 is closed generating a "0" level signal at the output terminal D so that the pulse motor 8 no longer operates the bypass valve 12 in the direction which closes it and thus the normal operation of the bypass valve 12 is ensured.

Next, it will be described how, in the above-described embodiment, the average value of excess air factor can be controlled to attain a given value of $\lambda > 1$ in spite of the fact that the preset voltage determined by the voltage dividing resistors 102 and 103 of the comparator 7a has been preset to the electromotive force $V_a$ which corresponds to the stoichiometric air-fuel ratio as shown in FIG. 1.

The reason that this can be accomplished is that a definite time T is required before the mixture adjusted with the additional air supplied to the carburetor downstream of the throttle valve 1b is drawn into the engine 3, burned and discharged to the exhaust pipe 4. In other words, when the output of the gas sensor 6 changes from "0" to "1" or vice versa, this change in the output produces an effect on the excess air factor of exhaust gases only after a delay of the definite time T. In the above-described embodiment, the opening speed of the bypass valve is designed to be higher than its closing speed and consequently during the time interval T the time rate of change of increase in the amount of additional air is higher than that for a decrease in the amount of additional air. Thus, the average value of excess air factor can be controlled to attain a given value of $\lambda > 1$, namely, the air-fuel ratio of mixture can be controlled to attain a value other than the stoichiometric air-fuel ratio.

Figure 5:
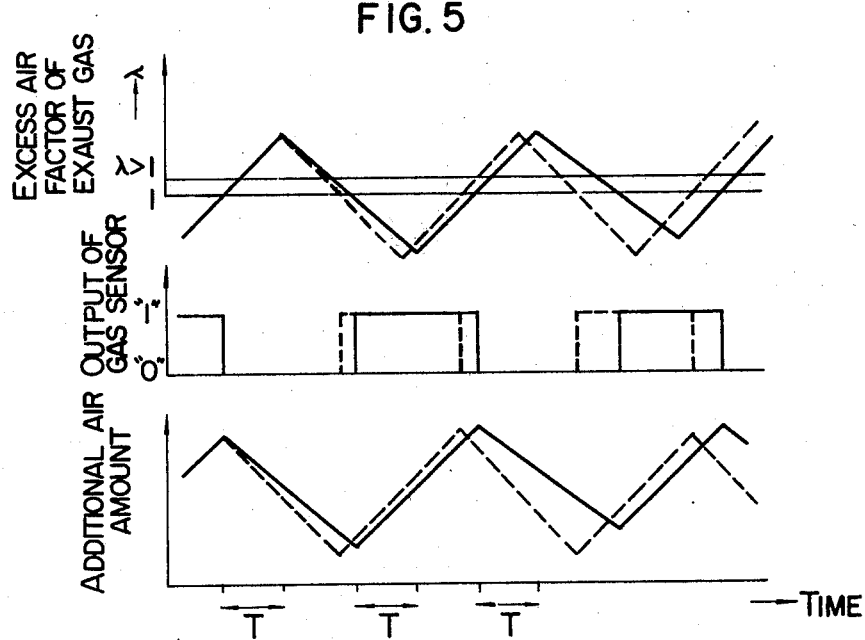
FIG. 5 is a characteristic diagram useful for explaining the operation of the embodiment of FIG. 2, showing variations with time of the excess air factor of exhaust gases, the output of the gas sensor and the amount of additional air, respectively.

The foregoing description may be more readily understood by referring to FIG. 5. FIG. 5 shows by the solid lines the excess air factor $\lambda$ of exhaust gases in the exhaust pipe 4, the output of the gas sensor 6 and the variations in the amount of additional air with time during the above-mentioned operation. The broken lines in the Figure show the similar variations according to a conventional system. In FIG. 5, during the time that the excess air factor remains $\lambda > 1$ (when the air-fuel ratio of mixture is smaller than the stoichiometric one), the amount of additional air is increased with time, whereas during the time that the excess air factor remains $\lambda > 1$, the amount of additional air is decreased with time. In the case of a conventional system wherein the same time rate of change is used for both increasing and decreasing the amount of additional air, even if there is a definite time delay between the operation of the gas sensor and the time that this operation produces an effect on the excess air factor of exhaust gases, the average value of the excess air factor becomes $\lambda = 1$ with the result that while it is possible to accomplish feedback control for adjusting the air-fuel ratio of mixture to the stoichiometric one, it is difficult to control so that the average value of excess air factor assumes any given value other than $\lambda = 1$. By contrast, in the case of the present invention where the bypass valve 12 is controlled by the control unit 7 in such a manner that the opening speed of the bypass valve 12 is higher than its closing speed, the time rate of change of increase in the amount of additional air becomes higher than that for decreasing the amount of additional air. Consequently, the average value of excess air factor can be controlled to attain a given value of $\lambda > 1$, namely, the air-fuel ratio of mixture can be controlled to attain a value greater than the stoichiometric air-fuel ratio. It is also evident that by making the closing speed of the bypass valve 12 higher than its opening speed, the average value of excess air factor can be controlled to attain a given value of $\lambda < 1$, namely, the air-fuel ratio of mixture can be controlled to attain a given value smaller than the stoichiometric air-fuel ratio.

On the other hand, there are instances where the electromotive force from the gas sensor 6 is caused to vary due to the exhaust gas temperatures or deterioration of the gas sensor 6 as shown in FIG. 1. With the apparatus of this invention, even in such case where the electromotive force from the gas sensor 6 is caused to vary abnormally, it is possible to control the air-fuel ratio of mixture to attain a value (point b in FIG. 1) which is greater than the stoichiometric air-fuel ratio (point a) by changing the preset voltage $V_a$ of the comparator 7a to a voltage $V_c$ corresponding to the air-fuel ratio (point c) which is slightly greater than the stoichiometric one. On the other hand by employing the control unit in such a manner that the time rate of change of decrease in the amount of additional air is made higher than that for increasing the amount of additional air, it is possible to control the air-fuel ratio of the mixture to attain a value which is smaller than the stoichiometric one. Accordingly, the air-fuel ratio can be preset to any value within an operable air-fuel ratio range of an internal combustion engine.

In accordance with this invention, in order to avoid the possibility of discriminating the air-fuel ratio in the characteristic portion of the gas sensor, subject to variations due to the exhaust gas temperatures or deterioration, it is possible, of course to set the preset voltage of the comparator 7a to $V_c$ and control the air-fuel ratio of mixture to attain the stoichiometric one.

We claim:

1. An air-fuel ratio adjusting apparatus for an internal combustion engine comprising:
   a carburetor connected to an intake manifold of an internal combustion engine and including a main passage and a bypass passage for supplying air-fuel mixture to said intake manifold, said main passage being provided with a throttle valve for controlling the amount of intake air, and said bypass passage being communicated with the downstream portion of said main passage and provided with a bypass valve for adjusting the air-fuel ratio of said air-fuel mixture by controlling the amount of additional intake air flowing therethrough;
   gas sensing means mounted in an exhaust pipe of said engine for sensing the oxygen content of exhaust gases to produce a sensed electrical signal;
   a control unit electrically connected to said gas sensing means for selectively producing forward and reverse shift signals in accordance with said sensed signal, said control unit including a comparator electrically connected to said gas sensing means for comparing whether said sensed signal is greater than or less than a predetermined preset value and producing the corresponding comparison signal, a pulse generating circuit for generating first and second pulse signals, the frequency of said first pulse signal being higher than that of said second pulse signal, a command circuit electrically connected to said comparator and said pulse generating circuit for delivering one of said first and second pulse signals in accordance with the comparison signal from said comparator, a reversible shift register electrically connected to said command circuit, said shift register being responsive to said first pulse signals to be sequentially shifted in one direction to produce said forward shift signals, said shift register being responsive further to said second pulse signals to be sequentially shifted in the other direction to produce said reverse shift signals, and a switching circuit electrically connected to said reversible shift register for selectively delivering said forward and reverse shift signals; and
   a pulse motor rotatable at a speed proportional to the frequency of said forward and reverse shift signals, respectively, said pulse motor being coupled to said bypass valve and electrically connected to said control unit for selectively receiving said forward and reverse shift signals to selectively operate said bypass valve in one direction which opens said by-pass valve and in the other direction which closes said bypass valve, the operating speed of said bypass valve in said valve opening direction being faster than that of said bypass valve in said valve closing direction.

2. An apparatus according to claim 1 further comprising fully closed position sensing means coupled to said bypass valve for sensing the fully closed position thereof to produce a fully closed signal and also electrically connected to said command circuit in said control unit to apply said fully closed signal to said command circuit when said bypass valve is in said fully closed position, and wherein said command circuit interrupts the delivery of said pulse signals which operate said bypass valve further in said valve closing direction when said bypass valve is in said fully closed position.

3. An apparatus according to claim 2, wherein said command circuit includes an inverter for inverting the output of said comparator, a first NOR gate for receiving the output of said inverter and said first pulse signals, and a second NOR gate for receiving the output of said fully closed position sensing means and said second pulse signals.

4. An apparatus according to claim 1, wherein said predetermined preset value corresponds to the value of said sensed signal produced by said gas sensing means when the air-fuel ratio of said air-fuel mixture is equal to a stoichiometric air-fuel ratio.

5. An apparatus according to claim 1, wherein said comparator includes a differential operational amplifier.

6. An apparatus according to claim 1, wherein said pulse generating circuit includes a frequency divider for dividing the frequency of said first pulse signals to produce said second pulse signals.

7. An apparatus according to claim 1, wherein the frequency of each of said first and second pulse signals is constant.

8. An air-fuel ratio adjusting system for an internal combustion engine comprising:
   a carburetor connected to an intake manifold of an internal combustion engine and including a main passage and a bypass passage for supplying an air-fuel mixture to said engine,
   said main passage being provided with a main valve for controlling the amount of the air-fuel mixture to be supplied to said engine, and said bypass passage being provided with a bypass valve for adjusting the air-fuel ratio of said air-fuel mixture by controlling the amount of air flowing therethrough;
   driving means for driving said bypass valve in a valve opening direction and a valve closing direction;
   air-fuel ratio sensing means mounted in an exhaust manifold of said engine for sensing the air-fuel ratio of the mixture supplied to said engine; and
   circuit means for actuating said driving means so as to drive said bypass valve in the valve opening direction at a first driving speed when the air-fuel ratio sensed by said air-fuel ratio sensing means is below a predetermined value, said circuit means also actuating said driving means so as to drive said bypass valve in the valve closing direction at a second driving speed slower than said first driving speed when the air-fuel ratio sensed by said air-fuel ratio sensing means exceeds said predetermined value.

9. An apparatus according to claim 8, wherein each of said first and second driving speeds is constant.

10. An air-fuel ratio adjusting system for an internal combustion engine comprising:
    a carburetor connected to an intake manifold of an engine for producing and supplying an air-fuel mixture thereto;
    air-fuel changing means for changing the air-fuel ratio of the mixture from low to high value and from high to low value;
    air-fuel ratio sensing means mounted in an exhaust manifold of said engine for sensing the air-fuel ratio of the mixture supplied to said engine; and
    circuit means for actuating said air-fuel ratio changing means to change the air-fuel ratio of the mixture produced at said carburetor from low to high value at a first changing speed when the air-fuel ratio sensed by said air-fuel ratio sensing means is below a predetermined value, said circuit means also actuating said air-fuel ratio changing means to change the air-fuel ratio of the mixture produced at said carburetor from high to low value at a second changing speed when the air-fuel ratio sensed by said air-fuel ratio sensing means exceeds said predetermined value, wherein said second changing speed is slower than said first changing speed.

11. An apparatus according to claim 10, wherein each of said first and second changing speeds is constant.

* * * * *